April 4, 1967 M. SCHMIDT 3,312,581
HOLLOW DECORATIVE PLASTIC ARTICLES
Filed June 19, 1961 2 Sheets-Sheet 1

INVENTOR
MAX SCHMIDT

April 4, 1967  M. SCHMIDT  3,312,581
HOLLOW DECORATIVE PLASTIC ARTICLES
Filed June 19, 1961  2 Sheets-Sheet 2

INVENTOR
MAX SCHMIDT

United States Patent Office 3,312,581
Patented Apr. 4, 1967

3,312,581
HOLLOW DECORATIVE PLASTIC ARTICLES
Max Schmidt, Brauhausstrasse 17, Ansbach,
Middle Franconia, Germany
Filed June 19, 1961, Ser. No. 122,371
Claims priority, application Germany, Aug. 4, 1958,
Sch 24,507; July 8, 1960, Sch 28,131
2 Claims. (Cl. 161—6)

The present application is a continuation-in part application to my copending application, Ser. No. 806,669, filed on Apr. 15, 1959, and entitled, "Christmas Tree Balls and Hollow Decorative or Packing Articles Made of Plastic Material," now abandoned, in which the priority of a German application of Aug. 4, 1958, is claimed.

The present invention relates to hollow articles made of plastic, primarily for decorative purposes, such as Christmas tree balls, and to a method and apparatus for producing such articles.

Prior to this invention, hollow decorative articles, for example, Christmas tree balls, have been made of plastic by placing two shell sections which were made by injection molding with their corresponding edges upon each other and by then connecting these edges to each other by an adhesive. In order to provide these hollow articles with a glossy surface, either the individual shell sections or the assembled articles were usually coated on the outside with a suitable lacquer. If the hollow article formed a Christmas tree ball, the necessary hanger for suspending the ball on a Christmas tree was generally formed in the molding operation of the shell sections.

These hollow decorative plastic articles as well as the method of producing the same have several serious disadvantages. Thus, for example, they have a considerable weight which is due to the fact that the injection molding process by which they are produced does not permit the walls of the shell sections to be made as thin as desired. In any event, it has so far not been possible by injection molding to produce such articles with a wall thickness of less than 0.8 mm. Such Christmas tree balls of plastic have therefore such a considerable weight that, when they are suspended on thinner branches of a Christmas tree, these branches are bent downwardly considerably. This results in an unattractive, overburdened appearance of the tree and also has the disadvantage that the balls easily slip off the downwardly bent branches. Furthermore, due to the considerable wall thickness of such balls, they require a considerable amount of material and their costs of production are therefore very high.

The manner of connecting the two plastic shells to each other by an adhesive is also very unsatisfactory and expensive since their edges must first be coated with the adhesive, then the shells must be properly applied upon each other, and finally they must be pressed against each other for a considerable length of time, namely, until the adhesive has completely set.

It has also been previously proposed to connect the plastic shells to each other by means of high-frequency welding. Such a welding operation has the disadvantage that the rate of production is very low, and that it is too expensive, especially in view of the high cost of the required high-frequency apparatus. Furthermore, with this manner of welding there is always the danger that the electrodes may puncture through the material. As a matter of fact, a welding of such molded parts by high frequency is possible only theoretically. Actually, in view of their wall thickness of 0.8 to 1 mm., it is practically impossible to fuse the two shell sections to each other by high-frequency welding. Thus, there is no other method available than to glue the shells together which leaves a glued seam which always remains visible, especially after the ball is coated, and detracts considerably from the appearance of the ball.

Another very important disadvantage of the previous hollow decorative articles of plastic and of the known methods of producing the same is the fact that it is extremely difficult to provide such plastic articles with a high gloss similar to that as on Christmas tree balls which are made of glass. Apart from the fact that it is difficult to find a lacquer which will produce such a high gloss, it is still more difficult to apply such a lacquer upon the outside of the plastic balls so as to adhere solidly thereto, and this can be attained only by special treatments which further increase the costs of production. However, even if all of these conditions are fulfilled, there still remains the danger that in the course of time the hollow plastic articles which are coated with lacquer on the outside will lose their gloss through external influences, for example, by the lacquer coating being rubbed and scratched off.

It is an object of the present invention to provide hollow articles of plastic for decorative purposes, for example, Christmas tree balls, as well as a method and apparatus for producing the same, which overcome the above-mentioned disadvantages of similar previous articles and the production methods thereof.

More specifically, it is an object of the invention to provide hollow plastic articles, such as Christmas tree balls of an extremely light weight and with a high outer gloss which cannot become damaged by external influences.

A further object of the invention is to provide a new method and apparatus for producing such hollow plastic articles far more economically and inexpensively than could be attained by the known methods.

A hollow decorative article according to the invention, for example, a Christmas tree ball, is also composed of a pair of shell-shaped parts of plastic which are secured to each other along their edges. A characteristic feature of this hollow article is that the two shell-shaped parts consist of transparent plastic sheeting which is metallized at one side which forms the inside of the hollow article. Due to the transparency of the plastic sheeting and the small thickness of the shell-shaped parts of approximately 0.2 mm., the shiny mirror-like metal coating which is applied upon the inside of these parts is also equally apparent from the outside. Since the metal coating of the hollow decorative article according to the invention is not applied in the usual manner upon the outside, but upon the inside, there is no possibility that the coating may be damaged by outside influences. Thus, regardless of how much or how roughly the article may be handled, it will always retain its high gloss and color. This gloss and color may, according to a preferred feature of the invention be further considerably increased by coloring the transparent plastic sheeting in any desired color or combination of different colors. The coloring materials may, for example, consist of pigments. Of course, in order to produce the shell-shaped parts the sheeting must consist of a plastic which is suitable for deep drawing.

According to the preferred embodiment of the invention, the colored gloss of the hollow plastic articles is produced by the cooperation of the thin metal coating on the inside of the article with the coloring of the transparent plastic sheeting. A lacquer coating on the outside as was required on the known Christmas tree balls is therefore entirely omitted according to the invention.

The metal coating on the inside of the hollow article only needs to be microscopically thin, while the thickness of the material of the article itself, that is, of the two shells, is preferably less than 0.8 mm.

The two plastic shells are preferably connected to each other by welding since this is the most secure type of connection. The particular manner in which this welding operation is preferably carried out according to the invention will be later described in detail.

According to another feature of the invention, the hollow plastic body may also be provided with a peripheral, outwardly projecting edge or rim along the line of connection of the two shells. This peripheral rim which may be formed in the course of production of the shells may be provided for decorative purposes and may, for example, be fluted or serrated. It is preferably made of a narrow width, for example, less than 2 mm., and it also forms a very simple means of applying a hanger. For this purpose, the rim may be provided at one point with a wider portion in which a small hole may be provided through which a thin wire or thread may be passed on which the article may be suspended.

In the production of the hollow decorative articles according to the invention, a thin transparent plastic sheeting is used which has a thickness of, for example, 0.2 to 0.3 mm. and is preferably tinted or colored. The desired shells are produced in this plastic sheeting in a manner known as such by vacuum deep drawing, whereby the thickness of the material is still further reduced so that the finished Christmas tree balls may have a wall thickness of even less than 0.2 mm. Obviously, when speaking herein of Christmas tree balls, this term is not intended to limit the hollow articles to a spherical shape, but they may be of a multitude of shapes as long as they may be produced by deep drawing, preferably in a vacuum.

The colored transparent sheeting is preferably fed to the deep drawing apparatus in a larger size, for example, in the form of strips of a length of 1 meter and a width of 30 cm. When a number of shells are drawn into these strips, they will remain connected by flat webs. This manner of operation in which a unit or a number of interconnected shells is attained has the advantage that the subsequent process of metallizing the inside of the shells can be carried out very economically by feeding the entire strip with the shell-shaped depressions therein to the metallizing apparatus. The metallizing process may be carried out in a conventional manner, for example, by vapor deposition of the metal, such as aluminum, in a high vacuum or by gas plating. If the latter process is applied, a gaseous metal compound which decomposes at higher temperatures and thereby precipitates the respective metal, for example, in the form of aluminum hydride or aluminum alkyl hydride, is brought in contact under higher temperatures with the plastic strips in which the shells are formed.

It should be pointed out in this connection that it is very important for attaining a high gloss that the metallizing process is carried out *after* the deep-drawing process. If the metallizing process is carried out prior to the deep-drawing process, it is practically unavoidable that the gloss of the metal coating will be lost, which is probably due to the fact that the drawing process produces structural changes in the metal coating.

After being metallized the shells are punched out of the plastic strip connecting the same, but so as to retain peripheral rims around their open sides. They are then placed upon each other and are welded together along and between these rims.

The heat for carrying out the welding operation is preferably generated by friction and pressure. For this purpose, the two shells lying with their rims on each other are pressed upon and rotated relative to each other. The rims will then rub against each other and thereby become heated to such an extent that the material will be softened and welded together along the engaging friction surfaces of the rims. This manner of welding is preferably carried out by holding one shell in a stationary position, while the other shell is rotated and at the same time pressed against the stationary shell and the projecting rim thereof. It has further been found that a very secure and complete weld will be attained if the pressure tools in which the relatively rotating shells are deposited and which hold the shells in the proper position during the welding process are knurled or serrated along their pressure-exerting edges which engage with the projecting rims of the shells. This serration or knurling produces the additional advantage that the projecting welded rim is itself attractive and further improves the attractive appearance of the entire hollow article.

For welding the two shells properly to each other, it is further of importance that the surfaces of the projecting rims which are rubbing against each other be provided with a thin coating of a lubricating fluid, for example, an oil on a mineral or synthetic base (silicon oil). This prevents the rims from being prematurely welded to each other only at individual points, whereby the rotation of the shells relatively to each other would be retarded which would prevent the entire surfaces of the rims from being properly heated to the welding temperature. The lubricating fluid which is to be wiped on the rim surfaces should therefore act as a welding inhibitor until the entire friction surfaces are heated to the temperature at which a proper welding will take place.

The apparatus for producing the hollow plastic decorative articles according to the invention has been described in detail in my copending application, Ser. No. 18,397, filed on Mar. 29, 1960, now abandoned. The method according to the present invention is distinguished from the manner of operation of the apparatus as described in the last-mentioned application primarily by the fact that the desired shells are produced of transparent plastic sheeting which is preferably transparently colored, and that these shells are then metallized on the inside. A special feature of the present invention not disclosed in my previous application also consists in the provision of a serration or knurling on the pressure surfaces of the tools for welding the two shells together and for attaining an additional decorative effect on the finished article.

The above-mentioned objects, features, and advantages of the present invention will become more clearly apparent from the following detailed description thereof which is to be read with reference to the accompanying drawings, in which:

FIGURE 7 shows a plan view of the finished Christmas tree ball as seen in a direction vertical to the peripheral projecting rim thereof; while

Figure 1:
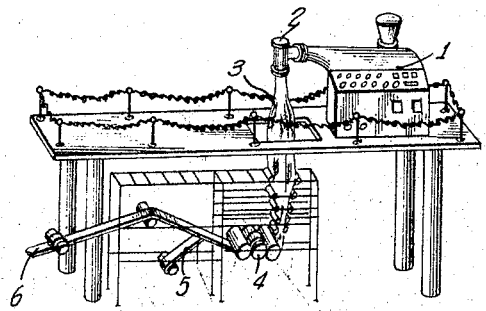
FIGURE 1 shows diagrammatically a general perspective view of the extrusion apparatus for producing the transparent plastic sheeting which, if desired, may also be colored.
Figure 2:
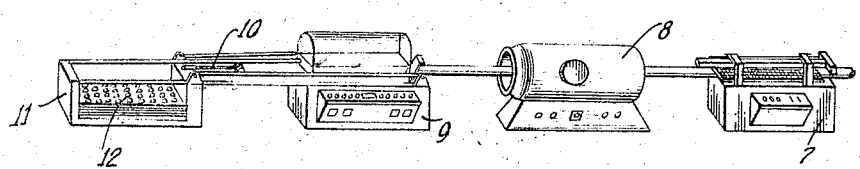
FIGURE 2 shows a diagrammatic perspective view of the vacuum deep-drawing apparatus.

Referring to the drawings, the different units of the apparatus according to the invention as shown in FIGURES 1 to 5 may be combined with each other in a manner so as to permit a substantially automatic production of the hollow decorative articles. The first stage of the entire apparatus is formed by the extruder 1 which is provided with a blow head 2. This blow head shapes the plastic material emerging from the extrusion nozzle in a conventional manner into a tubular hose 3 which is drawn downwardly and at the same time compressed into a flat hose by draw rolls 4. A suitable cutting mechanism, not shown, then cuts the lateral edges of the flat hose apart so that two superimposed webs or strips are formed. The lower strip 5 is then wound up on a supply reel, while the upper strip 6 is passed through a screen printing machine 7 with an automatically operating doctor blade and an automatic ink feed, in which it is printed in the desired manner.

From the printing machine 7, strip 6 then travels through a tunnel drying oven 8 and thereafter to the fully automatic vacuum drawing machine 9 in which the strip is inserted by a feeding device into the vacuum drawing mold. It is then heated within the mold in a conventional manner by radiation of a heating plate, not shown. After the strip is properly heated, the mold is evacuated and the material of the plastic strip is drawn into the individual parts of the mold. A screening device is then passed between the heating plate and the mold whereupon the plastic strip with the individual drawn shells therein adhering to each other is allowed to cool. The plastic strip is then automatically removed from the mold and withdrawn therefrom by a drawing device 10 as well as automatically cut into individual strips 12 of a suitable length which are then stacked upon each other in a container 11.

Figure 3:
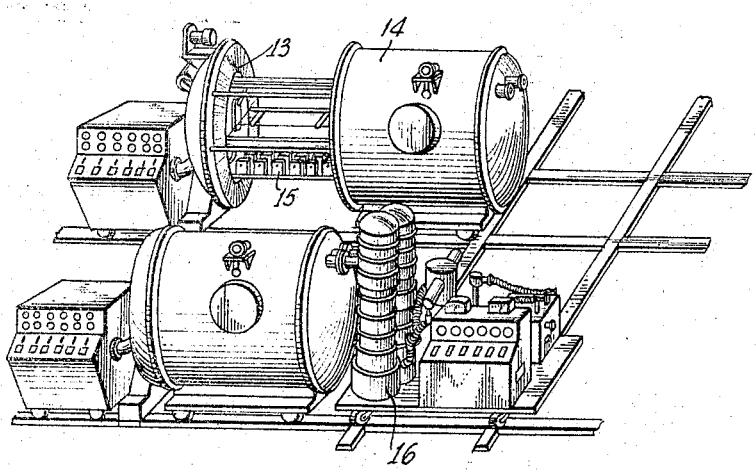
FIGURE 3 shows a diagrammatic perspective view of the metallizing apparatus.

The individual drawn plastic strips 12 are then metallized at the inside of the shell-shaped recesses by vapor plating of metal in a high vacuum in the apparatus as illustrated in FIGURE 3. The plastic strips 12 are for this purpose clamped in frames which, in turn, are slipped radially between two opposite plate disks 13 in a vessel 14 of a high-vacuum vapor plating apparatus, which may thus be filled with a large number of such clamping frames containing plastic strips. After being filled, vessel 14 is closed and highly evacuated. Thereupon, a gripping device which is operated by a cam control withdraws one of the clamping frames from the plate disks and turns the same about 90° so as to be disposed over the vapor source 15. After the plastic strip has been metallized, it is returned by the gripping device to its former position between the plate disks from which the gripping device then picks up the next clamping frame. It is evident from this description that a vapor plating apparatus of this design is capable of attaining a high rate of production. Since the high-vacuum pump unit 16 is extremely expensive, it is advisable to provide two metallizing vessels 14 side by side so that pump 16 can evacuate the two vessels alternately. This also has the advantage that, while one unit is being evacuated and operated, the vessel of the other unit may be emptied and refilled.

Each plastic strip which defines a shell is provided with a coating on the transparent plastic material of a transparent coloring material, at least on the inside of the shell. A thin metal layer is applied on the coloring material on the inside of the shell.

Figure 4:
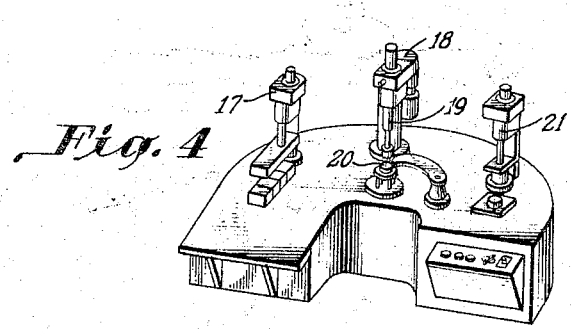
FIGURE 4 shows a diagrammatic perspective view of a combined unit which is composed of the apparatus for punching out the metallized sheets from the plastic strips, for welding the sheets together, and for further punching out the welded hollow bodies.
Figure 6:
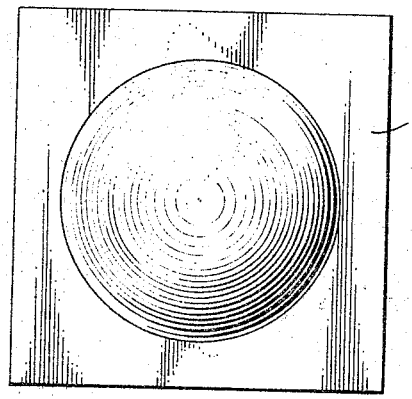
FIGURE 6 shows a plan view of a plastic strip in which a shell has been formed by deep drawing.

After the plastic strips have been metallized at the inside of the shell-shaped recesses, the individual shells which are still connected within each strip by webs 23, as shown in FIGURE 6, are stamped out by a punching apparatus 17, as shown in FIGURE 4 so as to leave a peripheral rim projecting outwardly from the edge of the shell. The punching apparatus 17 may be designed so as to permit all shells of one plastic strip 12 to be cut out simultaneously by a multiple-edge cutting blade.

The shells are then welded together in pairs by frictional heat in the welding apparatus 18. This apparatus comprises a rotatable upper part 19 which carries a tool of a shape in accordance with the shape of a shell. One of the shells is then inserted into this tool and the second into a similar tool in the lower part 20 of the apparatus which is at first held in a stationary position. The upper part 19 is then rotated at a high speed and at the same time pressed downwardly, so that a high frictional heat is produced between the two plastic shells whereby these shells are welded together along their rims. As soon as this occurs, the lower tool is released by a suitably adjusted friction clutch and likewise rotated so that the entire hollow body can then turn until the apparatus is switched off.

Figure 5:
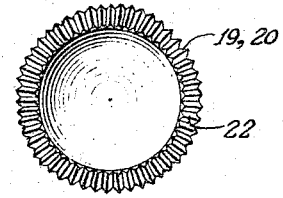
FIGURE 5 shows a plan view of one of the pressure tools of the welding apparatus, as seen in the direction toward the serrated edge thereof.

As illustrated in FIGURE 5, the pressure-exerting edges 19 and 20 of the cup-shaped welding tools are provided with a serration or knurling which considerably increases the frictional heat and is very important for attaining a uniform weld between the two shells. As already described, the projecting rims of the shells are also provided at the sides facing toward each other with a light coating of a lubricating fluid which acts as a welding inhibitor for a certain length of time until the frictional heat is uniformly distributed along the surfaces to be welded so as to insure the formation of a continuous weld along these surfaces.

Figure 7:
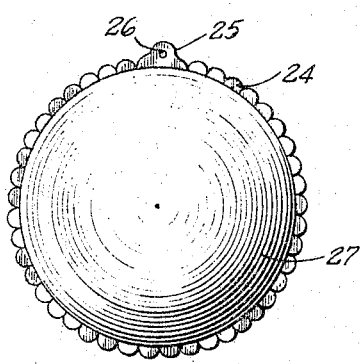
Figure 8:
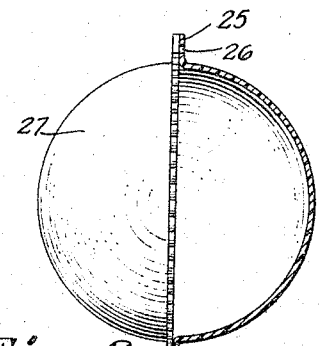
FIGURE 8 shows a plan view, partly in cross section, of the finished Christmas tree ball as seen in a direction at right angles to FIGURE 7.

After sufficiently cooling, the completed hollow body is then removed from the welding apparatus 18 by a suction device, not shown, and passed to another punching apparatus 21 in which the welded rim may be cut off to the desired size and shape. The welded rim may also be stamped out so as to have at one point a portion 25 of a greater width into which at the same time a small hole 26 may be punched through which a thin wire or thread may subsequently be passed on which the hollow body may be suspended. The finished hollow decorative body 27, as illustrated in FIGURES 7 and 8 may then be ejected from the punching apparatus 21 by compressed air.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A hollow decorative plastic article comprising a pair of shells each having a projecting rim around its edge and each consisting of thin transparent plastic sheeting, a coating of transparent coloring material on the inside of said shell and a thin metal layer on the inside on the said coloring material, said two shells being secured to each other along and between said rims so as to form said hollow article with a peripheral rim thereon, and means on said peripheral rim of said hollow article for suspending said article.

2. A hollow decorative plastic article comprising a pair of shells each having a projecting rim of a serrated shape around its edge and each consisting of thin transparent plastic sheeting, a coating of transparent coloring material on the inside of said shell and a thin metal layer on the inside on the said coloring material, said two shells being secured to each other along and between said serrated rims so as to form said hollow article.

(References on following page)

References Cited by the Examiner

UNITED STATES PATENTS

| | | | |
|---|---|---|---|
| 1,490,320 | 4/1924 | Hansen | 161—16 |
| 2,039,394 | 5/1936 | Dalton. | |
| 2,220,568 | 11/1940 | Fishel | 161—16 |
| 2,483,234 | 9/1949 | Roberts | 156—147 |
| 2,679,090 | 5/1954 | Farr | 156—73 |
| 2,688,202 | 9/1954 | O'Neill | 161—16 |
| 2,702,441 | 2/1955 | Jones | 41—10 |
| 2,719,374 | 10/1955 | Paione | 41—10 |
| 2,784,512 | 3/1957 | Goodwin | 161—16 |
| 2,794,284 | 6/1957 | Burnbaum | 41—10 |
| 2,903,390 | 9/1959 | Kojima | 156—73 |
| 2,933,428 | 4/1960 | Mueller | 156—73 |
| 2,972,371 | 2/1961 | Hermann et al. | 156—499 |
| 2,975,824 | 3/1961 | Schenkengel | 156—499 |
| 2,991,823 | 7/1961 | Jensen et al. | 156—499 |

FOREIGN PATENTS

| | | |
|---|---|---|
| 1,145,412 | 5/1957 | France. |
| 818,102 | 10/1951 | Germany. |

OTHER REFERENCES

Modern Plastics, August 1950, vol. 27, No. 12, pages 55–60.

EARL M. BERGERT, *Primary Examiner.*

HAROLD ANSHER, ALEXANDER WYMAN,
*Examiners.*